US007764190B2

(12) United States Patent
Mortensen

(10) Patent No.: US 7,764,190 B2
(45) Date of Patent: Jul. 27, 2010

(54) SYSTEM USING A FIBER OPTIC CABLE TO DISTRIBUTE COMMANDS FOR CONTROLLING OPERATIONS OF AN APPLIANCE

(75) Inventor: Peter Mortensen, Tustin, CA (US)

(73) Assignee: Universal Electronics Inc., Cypress, CA (US)

( * ) Notice: Subject to any disclaimer, the term of this patent is extended or adjusted under 35 U.S.C. 154(b) by 1335 days.

(21) Appl. No.: 11/240,159

(22) Filed: Sep. 30, 2005

(65) Prior Publication Data

US 2007/0206949 A1 Sep. 6, 2007

(51) Int. Cl.
*G05B 19/02* (2006.01)

(52) U.S. Cl. ........................... 340/825.22; 340/825.52; 340/5.6; 340/815.42; 340/825.27; 341/176; 341/174; 341/180

(58) Field of Classification Search ............ 340/825.22, 340/825.72, 825.69, 825.52, 815.42, 825.37; 250/227.21, 495.1, 494.1; 348/734; 455/419; 341/176, 174, 180
See application file for complete search history.

(56) References Cited

U.S. PATENT DOCUMENTS

| | | | |
|---|---|---|---|
| 4,703,359 | A | 10/1987 | Rumbolt et al. |
| 4,774,511 | A | 9/1988 | Rumbolt et al. |
| 4,864,647 | A | 9/1989 | Harrington |
| 4,878,254 | A | 10/1989 | Richardson |
| 4,959,810 | A | 9/1990 | Darbee et al. |
| 5,550,642 | A | 8/1996 | Kim et al. |
| 5,552,921 | A | 9/1996 | Hetzel et al. |
| 5,602,668 | A * | 2/1997 | Kuchta ....................... 398/172 |
| 5,614,906 | A | 3/1997 | Hayes et al. |
| 5,815,086 | A | 9/1998 | Ivie et al. |
| 5,872,562 | A | 2/1999 | McConnell et al. |
| 5,953,145 | A * | 9/1999 | Koyama ..................... 398/156 |
| 5,987,205 | A * | 11/1999 | Moseley et al. ............. 385/125 |
| 6,011,489 | A | 1/2000 | Ki Kwan et al. |
| 6,057,874 | A | 5/2000 | Michaud |
| 6,157,319 | A | 12/2000 | Johns et al. |
| 6,650,247 | B1 | 11/2003 | Hayes |
| 7,015,458 | B2 * | 3/2006 | Endicott ................ 250/227.21 |
| 7,137,742 | B2 * | 11/2006 | Theuerkorn et al. ........... 385/53 |
| 7,140,033 | B1 * | 11/2006 | Durden et al. ................ 725/80 |
| 2001/0053274 | A1 | 12/2001 | Roelofs et al. |
| 2002/0003475 | A1 | 1/2002 | Coe |
| 2003/0189509 | A1 | 10/2003 | Hayes et al. |
| 2004/0141744 | A1 | 7/2004 | Krill et al. |
| 2005/0018648 | A1 | 1/2005 | Scheelke |
| 2005/0081245 | A1 * | 4/2005 | Arad et al. .................. 725/100 |

* cited by examiner

*Primary Examiner*—Vernal U Brown
(74) *Attorney, Agent, or Firm*—Greenberg Traurig, LLP

(57) ABSTRACT

An IR blaster including one or more IR emitting LEDs used to generate IR signals for controlling operations of a plurality of controlled appliance and a plurality of fiber optic cables where one or more of the plurality of fiber optic cables are in light communication with an IR emitting LED. Each fiber optic cable is provided for distributing the IR signals generated by an IR LED to a respective one of the plurality of controlled appliances.

11 Claims, 2 Drawing Sheets

SYSTEM USING A FIBER OPTIC CABLE TO DISTRIBUTE COMMANDS FOR CONTROLLING OPERATIONS OF AN APPLIANCE

BACKGROUND

The present invention relates generally to home appliance control and, more particularly, to a system using a fiber optic cable to distribute commands for controlling operations of an appliance.

In the art it is known to use an infrared (IR) blaster to transmit commands for controlling operations of one or more appliances. For example, as described in commonly assigned U.S. Pat. No. 6,650,247, manufacturers have provided appliances, such as cable converter boxes, with the ability to remotely control the operation of another appliance, such as a VCR. To this end, the controlling appliance is provided with an IR blaster which is used to transmit commands from the controlling appliance to a controlled appliance. In this regard, the controlling appliance may transmit commands to the controlled appliance via the IR blaster in direct response to receipt of commands from a remote control or from yet another appliance and/or the controlling appliance may transmit commands to the controlled appliance via the IR blaster as a result of its programming (for example, to transmit commands to cause the VCR to record a program at a designated, programmed time). To be compatible with the controlled appliance, the controlling appliance may be configured to use an appropriate set of commands that may be selected from a library of commands stored within the controlling appliance. In addition, the controlling appliance may be configured by learning the appropriate set of commands from, for example, a remote control or by having the appropriate set of commands downloaded thereinto from, for example, the Internet, the controlled appliance, or the like. Still further, the controlling appliance may function to merely pass through commands that are received from a remote control or another appliance. Another example of a system that uses an IR blaster to control operations of one or more appliances is disclosed in U.S. Pat. No. 5,815,086. It is also known to use IR blasters in so called remote extender applications, such as the RF to IR system described in U.S. Pat. No. 4,864,647.

Known IR blasters generally include one or more electrical cables each having an attached IR LED. In this manner, the IR LED may be positioned in front of and near the IR receiver of the appliance to be controlled by, for example, placing it on or attaching it to the surface on which the appliance is resting or taping the IR LED directly over the IR receiver of the appliance. While these known IR blasters operate for their intended purpose, what is needed is an improved IR blaster, for example, one which may be more economically manufactured.

SUMMARY OF THE INVENTION

To address this and other needs, the following describes an IR blaster including one or more IR emitting LEDs used to generate IR signals for controlling operations of a plurality of controlled appliances and a plurality of fiber optic cables where one or more of the plurality of fiber optic cables are in communication via means of light energy (i.e., in light communication) with an IR emitting LED. Each fiber optic cable is provided for distributing the IR signals generated by an IR LED to a respective one of the plurality of controlled appliances.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
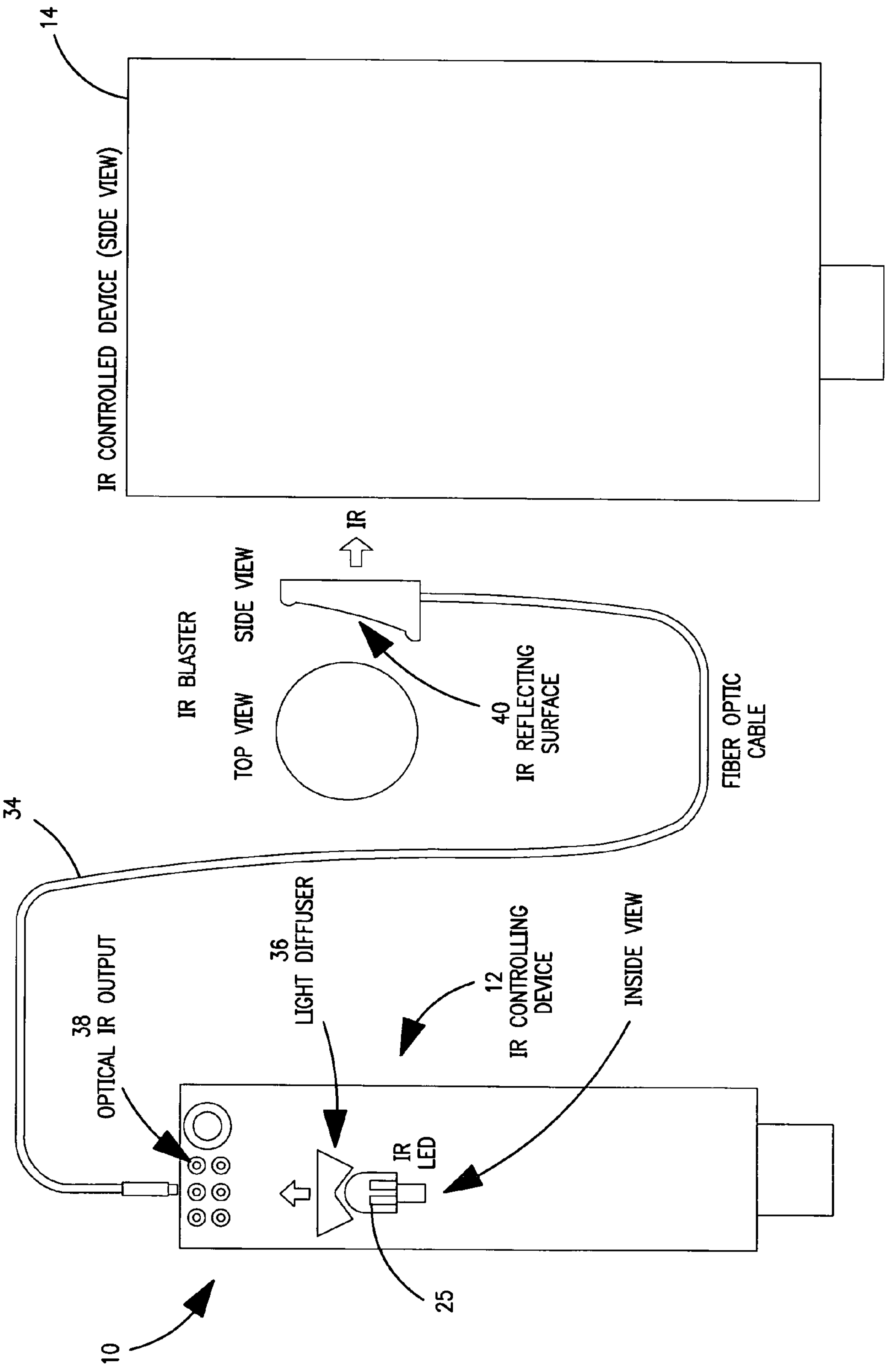
FIG. 1 illustrates a system which includes a controlling appliance having an IR blaster constructed in accordance with the present invention.

Turning now to the figures, wherein like reference numerals refer to like elements, a system using fiber optic cables to transmit commands for controlling operations of an appliance is hereinafter described. In preferred embodiments of the invention, the fiber optic cables are used in connection with an IR blaster. In this regard, the IR blaster may be a stand alone device or may be incorporated into another appliance, i.e., the controlling appliance. In addition, the IR blaster may be used to transmit commands as part of a system that is responsive to received signals, e.g., from a remote control or another appliance, and/or as a part of a system that is used to transmit commands responsive to its own programming, e.g., where commands are transmitted in response to internally generated events such as a timer achieving a pre-programmed time. Where responsive to external signals, these may without limitation be received via wireless (RF, IR, or the like) or wired means such as Ethernet, power line, phone line, serial port, etc., using any convenient transmission protocol.

Figure 2:
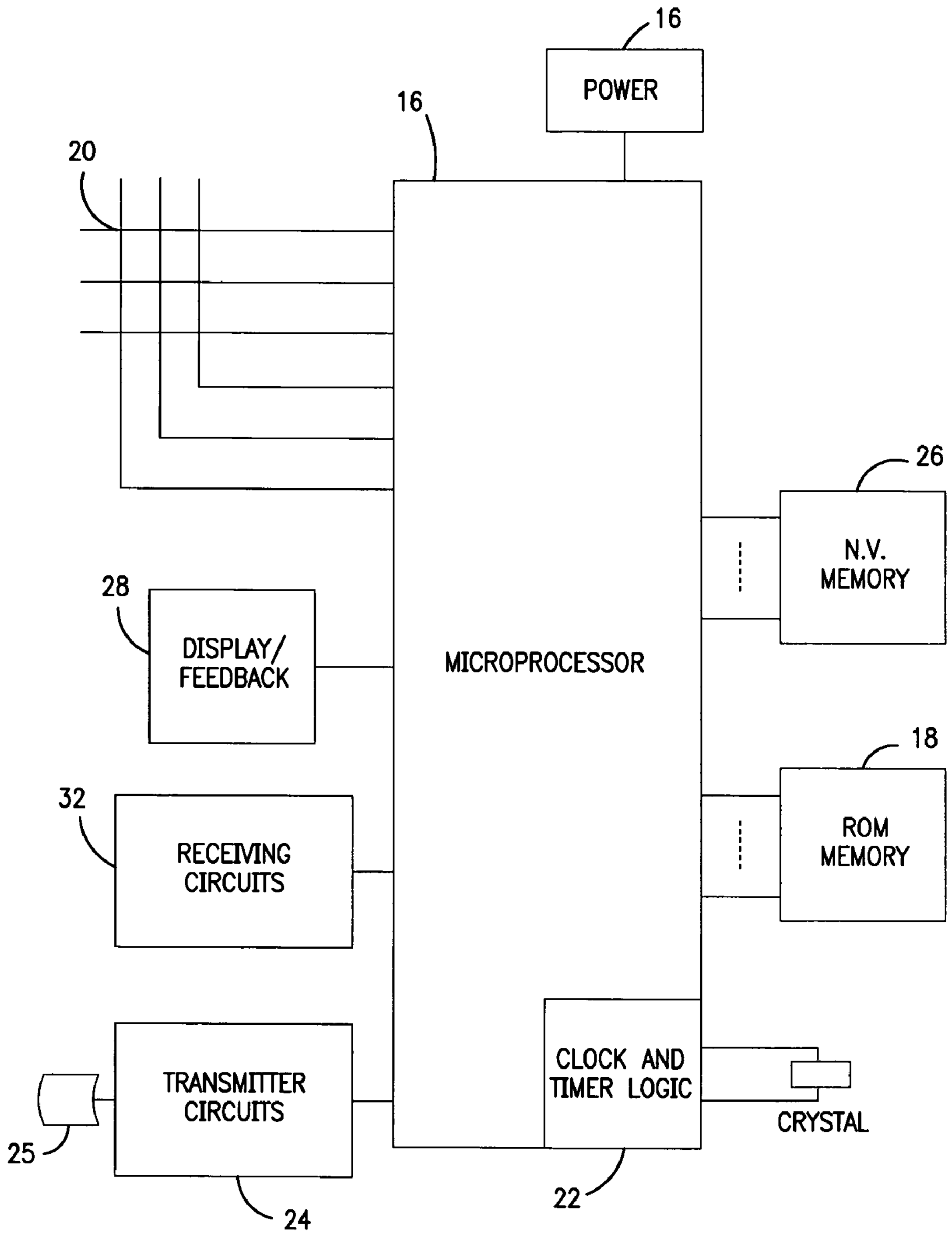
FIG. 2 illustrates a block diagram of the controlling appliance of FIG. 1.

By way of further example, the IR blaster hardware 10 may be part of or incorporated into a controlling appliance 12 which may for example take the form of a standalone unit in RF communication with other devices or may alternatively be incorporated into another appliance such as a cable converter box or the like, wherein the IR blaster hardware 10 is used to transmit commands to one or more controlled appliances 14, such as a VCR, as illustrated in FIG. 1. For transmitting commands from the controlling appliance 12 to the one or more controlled appliances 14, the controlling appliance 12 may include components that are similar to the components within a conventional remote control. As an illustrative example, the controlling appliance 12 may include as needed to support its operation, a processor 16 coupled to a ROM memory 18, an manual input device, such as a key matrix 20, an internal clock and timer 22, an IR transmission circuit 24 including an IR LED 25, a non-volatile read/write memory 26, a visible feed back device, such as an LED or display 28, a power supply 30, and/or a receiver circuit 32 as illustrated in FIG. 2. As will be described hereinafter, one or more fiber optic cables 34 are in light communication with the IR transmission circuit 24 to thereby provide a means for transmitting IR signals generated by the IR LED 25 to the controlled appliances 14 as is seen in FIG. 1.

In the illustrated example, the ROM memory 18 includes executable instructions that are intended to be executed by the processor 16 to control the operation of the controlling appliance 12. The instructions may provide for the generation of IR signals in response to signals received from an external device, e.g., a remote control, from another home appliance, via a network, or the like. In this regard, such signals would be received by the receiver circuit 32 of the controlling appliance 12. The instructions may additionally or alternatively provide for the generation of IR signals in response to user activation of one or more keys on the key matrix 20, the clock and timer circuit 22 attaining a predetermined value, or in response to another event internally generated by the controlling appliance 12. While the memory 18 is illustrated and described as a ROM memory, memory 18 can be comprised of any type of readable media, such as ROM, RAM, SRAM, FLASH, EEPROM, or the like. Meanwhile, the non-volatile read/write memory 26, for example an EEPROM, battery-backed up RAM, Smart Card, memory stick, or the like, may be provided to store configuration data and parameters as necessary. Preferably, the memory 26 is non-volatile or battery-backed such that data is not required to be reloaded after lose of power. In addition, the memories 18 and 26 may take the form of a chip, a hard disk, a magnetic disk, and/or an optical disk.

For commanding the operation of the controlled appliances 14, the memories 18 and/or 26 may also include one or more sets of commands that are to be transmitted from the controlling appliance 12 for the purpose of controlling the operation of the controlled appliances 14. The memories 18 and/or 26 may also include instructions which the processor 16 uses in connection with the transmission circuit 24 to cause the command codes to be transmitted in a format recognized by target controlled appliances 14. Still further, the memories 18 and/or 26 may include instructions which the processor 16 may use to accept, decipher, and act upon transmissions received by the receiver 32. In this regard, the instructions may provide for the transmission of commands selected from the memories 18 and/or 26 in response to the receiver 32 receiving a transmission from an external device, e.g., a remote, an appliance, or network, and/or may cause the IR transmission circuit 24 to retransmit a signal received by the receiver 32 (or an IR representation thereof) as previously noted. In the case where the transmission circuit 32 functions to transmit commands selected from memory it will be appreciated that the controlling appliance 12 may need to be configured to communicate with the controlled appliances 14. Exemplary methods for configuring a device to transmit commands are disclosed in U.S. Pat. Nos. 6,650,247, 6,157,319, 5,614,906, 4,959,810, 4,774,511, 4,703,359, and 5,872,562, among others, and, as such, need not be discussed further herein. It will also be appreciated that the commands used to control the operation of controlled appliances 14 may be remotely stored at, for example, a cable system headend and downloaded via a data path established through a channel tuner in the manner described in U.S. Pat. No. 6,057,874, may be obtained from a Web-based server as contemplated, for example, in co-pending U.S. patent application Ser. No. 10/151,653 (2003/0189509), etc. Still further, it will be understood that, if the identities of the target controlled appliance(s) 14 are predetermined, the steps of configuring the controlling appliance 12 can be avoided.

For transmitting command signals generated by the IR LED 25 to the one or more target controlled appliances 14, the IR blaster hardware 10 preferably includes one or more fiber optic cables 34 which are in light communication with the IR LED 25. To this end, a light diffuser 36 may be interposed between the IR LED 25 and the receiving ends of the fiber optic cables 34. As further illustrated in the exemplary embodiment of FIG. 1, the controlling appliance 12 may be provided with one or more output jacks 38 into which may be plugged the receiving ends of the fiber optic cables 34. To facilitate the communicating of IR signals generated by the IR LED 25 and carried to the target controlled appliances 14 by the fiber optic cables 34, the transmitting ends of the fiber optic cables 34 may terminate in an adapter 42 provided with an IR reflecting surface 40 arranged so as to direct infrared light emanating from fiber optic cable 34 towards controlled appliance 14. It will be appreciated that the transmitting end of the fiber optic cables 34 with adapter 42 is to be positioned proximate to the IR receiver 44 of a corresponding one of the target controlled appliances 14. In an alternate embodiment (not shown) input jacks (similar in configuration to output jacks 38) may be provided on controlled appliance 14 (for instance on the rear portion of the appliance in order to hide the connector from view) such that reliable and simple connection can be made for transfer of the control information. It will be understood and appreciated that connection from the input jack to the IR receiver 44 or electrical circuitry associated with the IR receiver 44 may be implemented inside target controlled appliance 14 by either optical or electrical means, respectively, in order to deliver the appropriate command data to the IR receiver or IR receiver circuitry from the controlling appliance.

In the embodiment illustrated in FIG. 1, a single IR LED 25 is used to generate IR signals which may be simultaneously transmitted to plural, target controlled appliances 14 by respective fiber optic cables 34. In such an embodiment, the single IR LED 25 will be used to generate IR signals appropriate for commanding all of the plural, target controlled appliances 14. As an alternative, it will be appreciated that multiple IR LEDs 25 may be used with each IR LED being in light communication with one or more fiber optic cables 34. In such a case, the IR LEDs 25 may be used to transmit IR signals for designated one(s) of the plural, target controlled appliances 14 and the consumer will have to ensure that the corresponding fiber optic cables 34 are positioned appropriately with respect to the IR receivers of the controlled appliances 14. It will be appreciated that the use of multiple IR LEDs in conjunction with programming in the controlling appliance may enable a user to avoid control problems associated with control of an entertainment system containing two or more controlled appliance that are responsive to the same commands by appropriate configuration of the fiber optic cables associated with each appliance.

While specific embodiments of the present invention have been described in detail, it will be appreciated by those skilled in the art that various modifications and alternatives to those details could be developed in light of the overall teachings of the disclosure. For example, it will be appreciated that the IR blaster 10 need not be incorporated as part of an appliance but may be a stand alone controlling device. Still further, the IR blaster 10 need not be an integral part of an appliance but may be linked to an appliance, a network, or the like by means of wired or wireless communications. Accordingly, it will be understood that the particular arrangements and procedures disclosed are meant to be illustrative only and not limiting as to the scope of the invention which is to be given the full breadth of the appended claims and any equivalents thereof.

The references set forth within this application are hereby incorporated by reference in their entirety.

What is claimed is:

1. An IR blaster, comprising:

a processor;

a plurality of IR emitting LED used to generate IR signals as directed by the processor, the IR signals being generated to control operations of one or more of a plurality of controlled appliances; and a plurality of fiber optic cables wherein one or more of the plurality of fiber optic cables are in light communication with each of the plurality of IR emitting LEDs, each fiber optic cable provided for distributing the IR signals generated by its corresponding IR LED to a respective one of the plurality of controlled appliances.

2. The IR blaster as recited in claim 1, comprising one or more light diffusers interposed between the plurality of IR LEDs and the plurality of fiber optic cables.

3. The IR blaster as recited in claim 2, comprising a plurality of plugs positioned for releasably receiving an end of a corresponding one of the plurality of fiber optic cables and for positioning the fiber optic cables in proximity to the one or more light diffusers.

4. The IR blaster as recited in claim 1, comprising a receiver for receiving signals wherein signals received by the receiver are used to trigger generation of IR signals by one or more of the plurality of IR LEDs.

5. The IR blaster as recited in claim 4, wherein the receiver functions to receive signals from a remote control.

6. The IR blaster as recited in claim 4, wherein the receiver functions to receive signals from a network.

7. The IR blaster as recited in claim 4, wherein the IR signals generated by the one or more of the plurality of IR LEDs are a representation of signals received by the receiver.

8. The IR blaster as recited in claim 1, comprising a memory in which is stored sets of commands for controlling operations of a plurality of appliances and wherein the IR signals generated by one or more of the plurality of IR LEDs are generated by using one or more of the sets of commands.

9. The IR blaster as recited in claim 1, wherein the IR signals generated by one or more of the plurality of IR LEDs are learned from a remote control.

10. The IR blaster as recited in claim 1, comprising a timing circuit for generating signals wherein signals generated by the timing circuit are used to trigger generation of IR signals by one or more of the plurality of IR LEDs.

11. The IR blaster as recited in claim 1, wherein each of the fiber optic cables comprises a light reflecting surface.

* * * * *